(12) United States Patent
Lan et al.

(10) Patent No.: US 10,292,219 B2
(45) Date of Patent: May 14, 2019

(54) LAMP WITH PLUGGABLE CONTROL INTERFACE

(71) Applicant: Shenzhen Guanke Technologies Co., Ltd, Shenzhen (CN)

(72) Inventors: Qing Lan, Shenzhen (CN); Xuren Qiu, Shenzhen (CN); Ligen Liu, Shenzhen (CN); Qing Ma, Shenzhen (CN); Shoubao Chen, Shenzhen (CN)

(73) Assignee: SHENZHEN GUANKE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/111,190

(22) Filed: Aug. 23, 2018

(65) Prior Publication Data

US 2019/0037657 A1 Jan. 31, 2019

(30) Foreign Application Priority Data

Aug. 3, 2018 (CN) .......................... 2018 1 0875897

(51) Int. Cl.
| | |
|---|---|
| *H05B 33/08* | (2006.01) |
| *H05B 37/02* | (2006.01) |
| *F21V 29/71* | (2015.01) |

(52) U.S. Cl.
CPC ......... *H05B 33/0818* (2013.01); *F21V 29/71* (2015.01); *H05B 33/0845* (2013.01); *H05B 37/0272* (2013.01)

(58) Field of Classification Search
CPC .... H05B 37/02; H05B 37/0272; H05B 33/08; H05B 33/0818; H05B 33/0842; H05B 33/0863; H05B 33/0869; F21V 23/00; F21V 29/71
See application file for complete search history.

(56) References Cited

U.S. PATENT DOCUMENTS

| | | | |
|---|---|---|---|
| 5,243,508 A * | 9/1993 | Ewing ..................... | F21S 2/005 362/431 |
| 9,549,440 B2 * | 1/2017 | Hulett ................ | H05B 33/0842 |
| 2011/0062888 A1 * | 3/2011 | Bondy ............... | H05B 33/0815 315/294 |
| 2016/0061423 A1 * | 3/2016 | Fong ........................ | F21K 9/23 362/363 |

* cited by examiner

*Primary Examiner* — Thai Pham (57) ABSTRACT

The present disclosure relates to a lamp with pluggable control interface including a head, a power device electrically connecting to the head, a body, and a control interface device. The body is configured with a receiving chamber, a heat sink, and a connection portion connecting to the power device. The control interface device includes a plug-in end, a first circuit board electrically connecting to the plug-in end, a controller configured on the first circuit board, the plug-in end engages with the connection portion, and the controller is configured to turn on or off the lamp or to turn on a dimming function.

16 Claims, 14 Drawing Sheets

LAMP WITH PLUGGABLE CONTROL INTERFACE

CROSS REFERENCE TO RELATED APPLICATIONS

This application claims priority to Chinese Patent Application No. 201810875897.0, filed Aug. 3, 2018, which is hereby incorporated by reference herein in its entirety.

BACKGROUND

1. Technical Field

The present disclosure generally relates to a lamp field, and particularly to a lamp with pluggable control interface.

2. Description of Related Art

A conventional lamp generally includes a lamp head, a power supply device, a lamp body, etc., the lamp head is externally connected with an input power source, and the external switch controls the lamp body to be turned on and off by the power supply device. Usually, the control mode is relatively simple, and the extended applications are limited. If no dimming device is provided, the dimming function cannot be realized, that is, only a few adaptation scenes may be realized. Unless the control circuit is separately arranged, it is difficult to change the lighting control mode. Moreover, conventional lamps with dimming or sensing functions are generally integrated with the dimming or sensing control module, which are not separable. It is difficult to adjust the control mode after the lamp is shipped, including replacement between different types of control modules, or replacement between different versions. As such, the lamp and/or the luminaire installation lines may have to be replaced when the luminaire control module is upgraded or updated, which result in inconvenient use and increased cost.

SUMMARY

The present disclosure relates to a lamp having a pluggable control interface for turning on and off the lamp, and so does the dimming functions. At the same time, a plurality of control modes, intelligent and simple operation, and a large range of adaptation may be provided.

In one aspect, a lamp with pluggable control interface includes: a head, a power device electrically connecting to the head, a body, and a control interface device; wherein the body is configured with a receiving chamber, a heat sink, and a connection portion connecting to the power device; wherein the control interface device includes a plug-in end, a first circuit board electrically connecting to the plug-in end, a controller configured on the first circuit board, the plug-in end engages with the connection portion, and the controller is configured to turn on or off the lamp or to turn on a dimming function.

Wherein the control interface device is detachable; and the connection portion includes a plug engaging with the plug-in end of the control interface device, a holding portion, and at least one fixing portion extending along a periphery of the holding portion, and a wiring portion, and the fixing portion is perpendicular to the wiring portion such that the connection portion is stably fixed within the receiving chamber.

Wherein the control interface device includes an upper case, a lower case, and a receiving portion cooperatively defined by the upper case and the lower case; and the first circuit board is received within the receiving portion, and a cross section of the receiving portion is circular.

Wherein the upper case includes a plurality of buckle holes; the lower case includes a plurality of first holding walls perpendicular to the first circuit board to fix a location of the first circuit board; and the lower case includes a plurality of second holding walls corresponding to the buckles holes of the upper case such that the second holding walls respectively engage with the buckle hole to fix the upper case and the lower case.

Wherein the controller adopts one or a combination of controlling modes, and the controlling modes includes a voltage-dimming mode, a resistance-dimming mode, and a PWM dimming mode.

Wherein the controller is configured to be one of a plurality of controlled modes comprising a microwave sensing mode, an infrared sensing mode, and a sound sensing mode.

Wherein the first circuit board includes a power supply port, a power regulation circuit, a Pulse width modulation (PWM) output module, a PWM signal output port, and a lighting-time adjustment circuit, and the controller respectively connects to the power regulation circuit, the lighting-time adjustment circuit, and the PWM output module, the power supply port connects to the power regulation circuit, and the PWM output module connects to the PWM signal output port.

Wherein the first circuit board includes a signal amplification module, a high frequency oscillation module and an antenna module, the controller connects to the signal amplification module, the high frequency oscillation module connects to the signal amplification module, and the antenna module connects to the high frequency oscillation module to receive the sensing signals.

Wherein the first circuit includes a signal amplification module, a passive infrared detector and a Fresnel lens, the controller connects to the signal amplification module 415, the passive infrared detector is connected to the signal amplification module, and the Fresnel lens and the passive infrared detectors are connected.

Wherein the first circuit board includes a sound receiving module connected to a signal amplification module, the controller connects to the signal amplification module, and the sound receiving module receives sound signals.

Wherein the first circuit includes a signal amplification module and an infrared receiving module connecting to the signal amplification module.

Wherein the first circuit includes a video processor, a wireless communication module, and a storage, the video processor connects to a camera, and the wireless communication module connects to an antenna module.

Wherein the first circuit board includes a wireless communication module and a smoke sensor connected to the controller, and the wireless communication module is connected to the antenna module.

Wherein the first circuit includes a high voltage generator and a fan connected to the controller, and the high voltage generator and a discharge-ion-emitting head are connected, the discharge-ion-emitting head\and the high voltage generator form a negative-ion-generator module for generating negative ions, and the fan is configured to accelerate a diffusion of negative ions to the air around the lamp.

Wherein the first circuit includes an audio amplifier, a wireless communication module, and a storage connected to the controller, and the audio amplifier is connected to the speaker, and the wireless communication module is connected to the antenna module, audio files are configured to be stored in the storage, and the audio amplifier and the speaker are configured to play the audio files.

Wherein the first circuit board includes a humidity detecting module and a temperature detecting module connected to the controller, the humidity detecting module and the temperature detecting module are configured to detect a temperature and a humidity of a surrounding environment.

In view of the above, various control modes, such as controlling lighting, extinction, and dimming functions of the lamp, may be realized. The main body of the lamp can be used separately. The same lamp can be used with different control modules in different environments. When the control interface device is upgraded, only the independent module with small cost needs to be replaced. The independent control interface may also be located in a place farther away from the lamp, which brings more choices to the lighting design. Even if the lamp is not connected to the control interface device, it can quickly access various control systems and use it later. And through the control interface device, a lot of extended features, such as camera, fire alarm, audio and other functions, may be added.

Other objects, advantages and novel features of the invention will become more apparent from the following detailed description when taken in conjunction with the accompanying drawings.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Referring to FIGS. 1-2 and 5-6, the lamp with pluggable control interface includes a head 1, a power device 2, a body 3, and a control interface device 4. The body 3 is configured with a receiving chamber 30 and a connection portion 31 electrically connecting to the power device 2. The connection portion 31 includes a plug 310.

The control interface device 4 includes a plug-in end 40, a first circuit board 41 electrically connecting to the plug-in end 40, a controller 42 configured on the first circuit board 41. The plug-in end 40 may be detached manually or may engage with the plug 310. The controller 42 turns on or off the body 3, or turns on a dimming function.

In an example, the control interface device 4 may be configured to realize a variety of controlling method. When the control interface device 4 is detached, the lamp may be controlled by original switches, and thus the body of the lamp may be independently used. In another example, the lamp may be configured to function with different controller. Consumers may only replace the original control interface device 4 with an updated one without replacing the whole lamp, which greatly saves the cost. In addition, the control interface device 4 may be configured with extension wires such that the lamp may be function even being far away from the control interface device 4.

Figure 1:
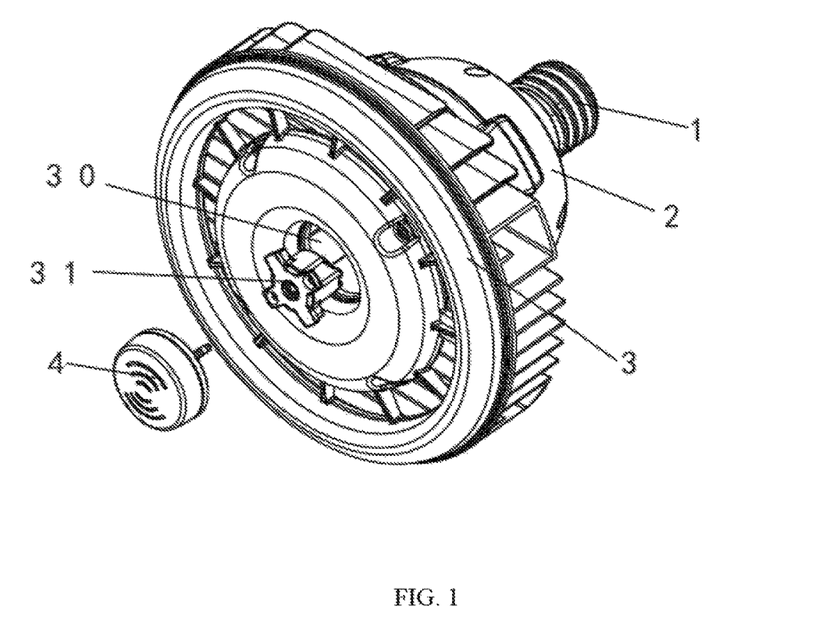
FIG. 1 is an exploded view of the lamp with pluggable control interface in accordance with one embodiment of the present disclosure.
Figure 2:
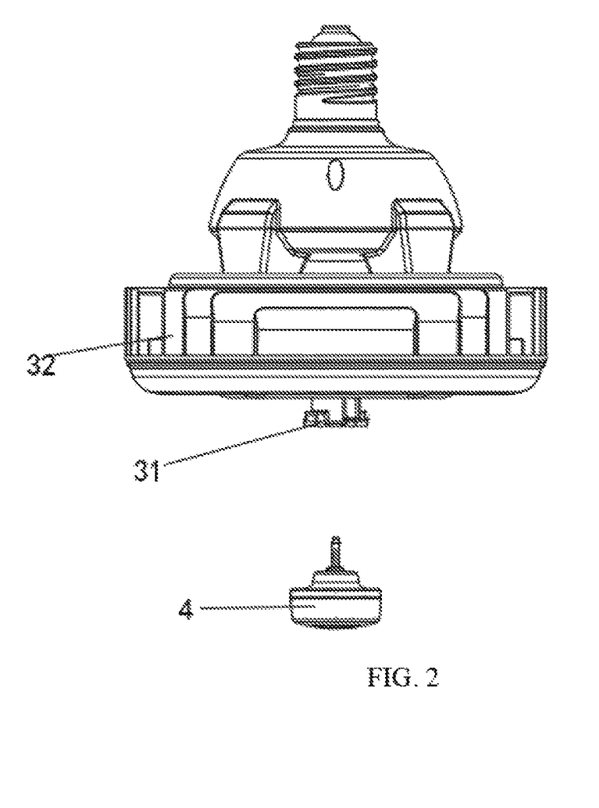
FIG. 2 is another perspective view of FIG. 1.
Figure 3:
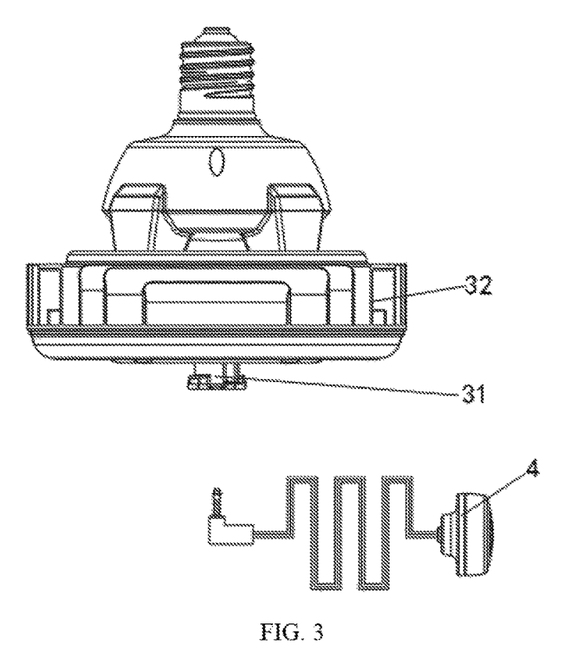
FIG. 3 is a schematic view of the control interface in accordance with one embodiment of the present disclosure.
Figure 4:
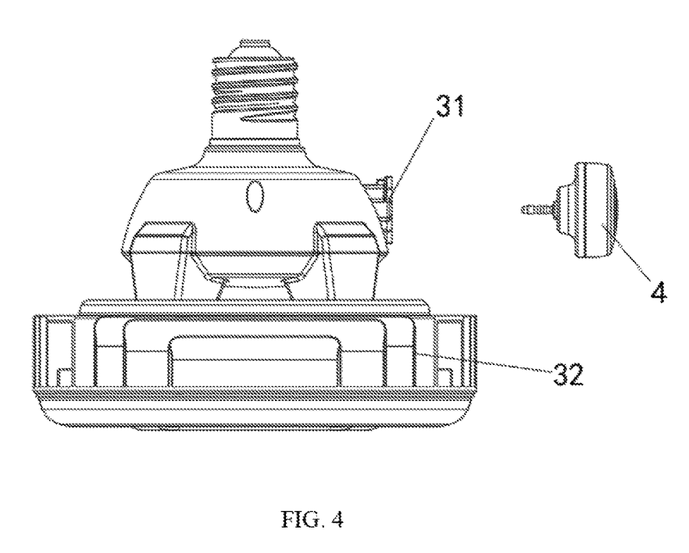
FIG. 4 is a schematic view showing another assembly method of the control interface in accordance with one embodiment of the present disclosure.
Figure 5:
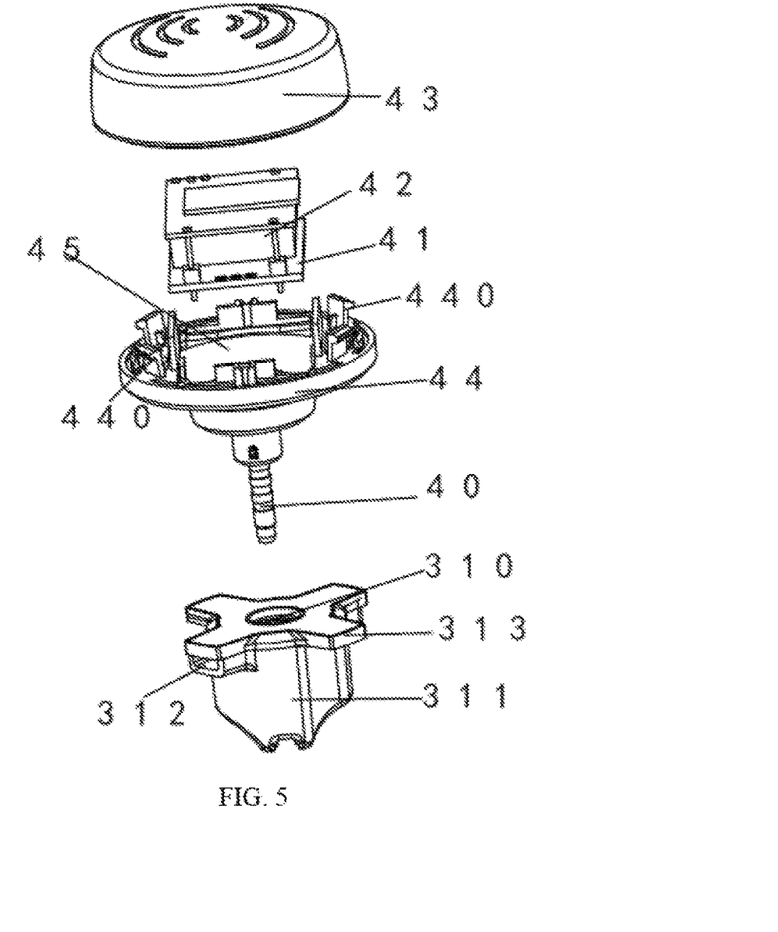
FIG. 5 is an exploded view of the control interface and the connection portion in accordance with one embodiment of the present disclosure.

Referring to FIGS. 2 and 3, the body 3 includes a heat sink 32. In an example, the heat sink 32 is configured on a bottom of the receiving chamber. The connection portion 31 may be configured within the heat sink 32, on a bottom of the heat sink 33, or on a lateral surface of the heat sink 32.

In an example, the connection portion 31 includes a holding portion 313, a fixing portion 311 extending along a periphery of the holding portion, and a wiring portion 312. In an example, the connection portion 31 includes three fixing portions 311. The fixing portion 311 is perpendicular to the wiring portion 312 such that the connection portion 31 may be stably fixed within the receiving chamber 30. In addition, the wirings may be arranged in an efficient way with respect to the dimension of receiving chamber 30.

In an example, the controller 42 may adopt one of or a combination of controlling modes, including a voltage-dimming mode, a resistance-dimming mode, and a PWM dimming mode.

(1) The voltage-dimming controlling mode: Voltage signals are inputted to the power device. A current outputted by the power device changes in accordance with the voltage signals so as to adjust a brightness of the lamp. In an example, the voltage adopted by the voltage-dimming controlling mode may be in a range from 0 to 10 V. When the voltage is configured to be 0V, the brightness of the lamp is the maximum. When the voltage is configured to be 10V, the brightness of the lamp is the minimum.

(2) Resistance-dimming controlling mode: The brightness of the lamp is configured to be decreased when the resistance applied to the lamp is smaller. In an example, the resistance may be in a range from 0 to 100 kΩ. It can be understood that the brightness of the lamp may change sharply when the applied resistance is in the range from 0 to 20Ω, and the brightness of the lamp may change smoothly when the applied resistance is in the range from 20 to 100Ω.

(3) PWM dimming controlling mode: The brightness of the lamp is configured to be increased when a duty cycle ratio is increased.

Figure 7:
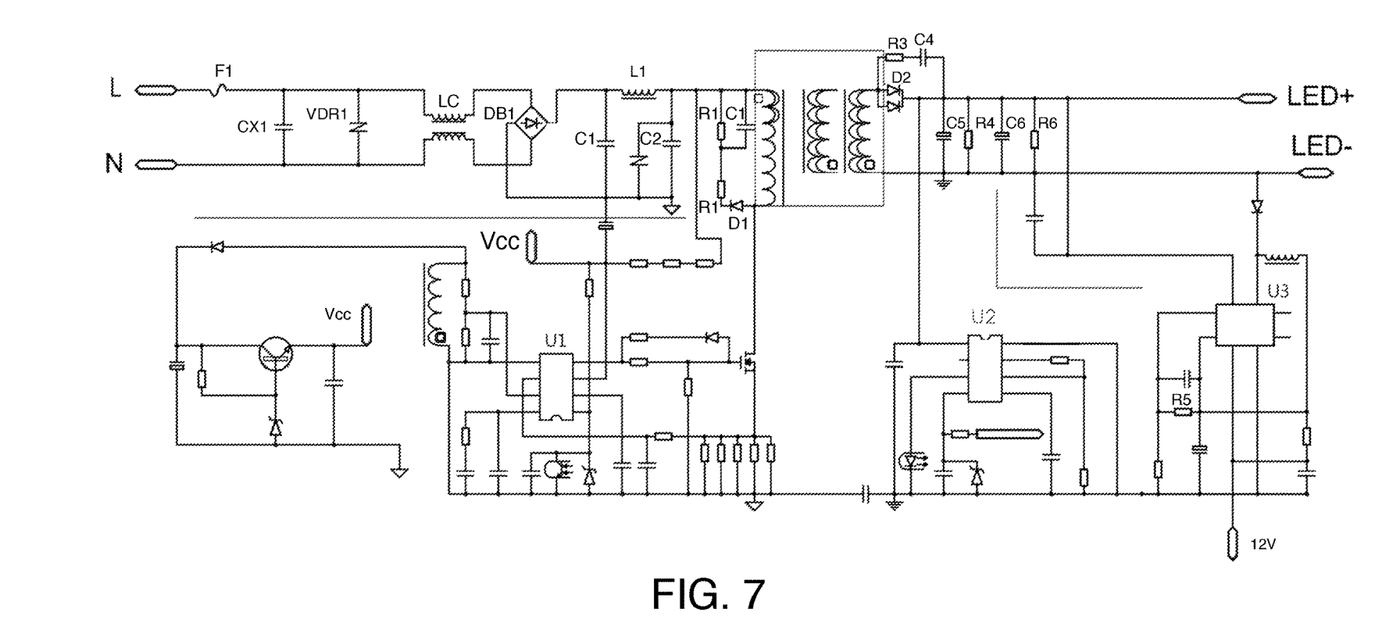
FIG. 7 is a circuit diagram of the lamp with pluggable control interface in accordance with one embodiment of the present disclosure.

In this embodiment, please refer to FIG. 7. The L terminal and the N terminal are power input terminals, and the L terminal and the N terminal are connected to a rectifying and filtering circuit. The rectifying and filtering circuit includes a fuse F1, a safety capacitor CX1, a varistor VDR1, and a common mode inductor LC, a rectifier bridge DB1, a capacitor C1, an inductor L1, and a capacitor C2. The capacitor L1 is configured to improve EMI performance, and the capacitor C2 is configured to increase PF. The rectifying and filtering circuit is connected to a spike-absorption circuit for absorbing peaks in the circuit. The capacitor C3 and the resistor RI are connected in parallel with the resistor RI and the diode D1; the spike-absorption circuit is connected to an isolation transformer. The resistors R3 and C4 are connected in series to absorb the spike signals. The diode D2 is used for rectification. The resistors R4 and R6 are configured to discharge loads, that is, abnormal disconnection or short circuit caused by instantaneous overcurrent or overvoltage. The capacitor C5C6 is a charge-discharge capacitor. The chip U2 connects to the controller 42. The U1 is the transformer. The voltage regulator circuit provides a constant voltage of 12V. In another example, the voltage regulator circuit may provide a voltage of 5V or other voltage.

In an example, the plug 310 is any one of a headphone jack, a USB interface, and an RJ45 interface.

Figure 6:
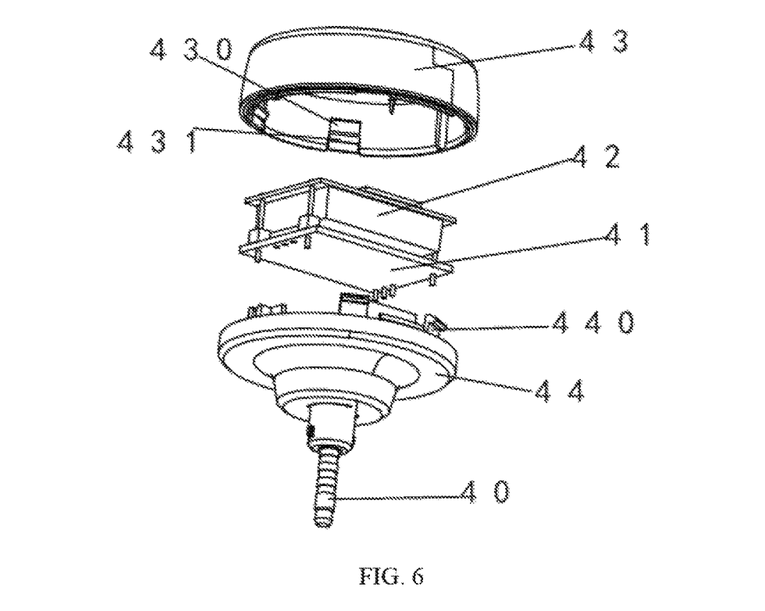
FIG. 6 is an exploded view of the control interface in accordance with one embodiment of the present disclosure.

In an example, the control interface device 4 includes an upper case 43, a lower case 44, and a receiving portion 45 cooperatively defined by the upper case 43 and the lower case 44. The first circuit board 41 is received within the receiving portion 45.

In an example, a cross section of the receiving portion 45 is circular.

In an example the plug-in end 40 may directly insert into the lower case 44, or may connect to the lower case 44 via wirings.

In an example, the lower case 44 further includes a plurality of first holding walls 440 perpendicular to the first circuit board 41. The upper case 43 includes a plurality of buckle holes 430. The upper case 43 includes a plurality of second holding walls 431 corresponding to the buckle holes 430 such that the second holding walls 431 may respectively engage with the buckle holes 430 to fix the upper case 43 and the lower case 44.

In an example, the controller 42 is controlled by an external device or an external environment, and the controlled modes may include microwave sensing, infrared sensing, sound sensing, light brightness control, Bluetooth control, WiFi control, ZigBee control, 5G4G network control, and radio frequency signals modes.

Figure 8:
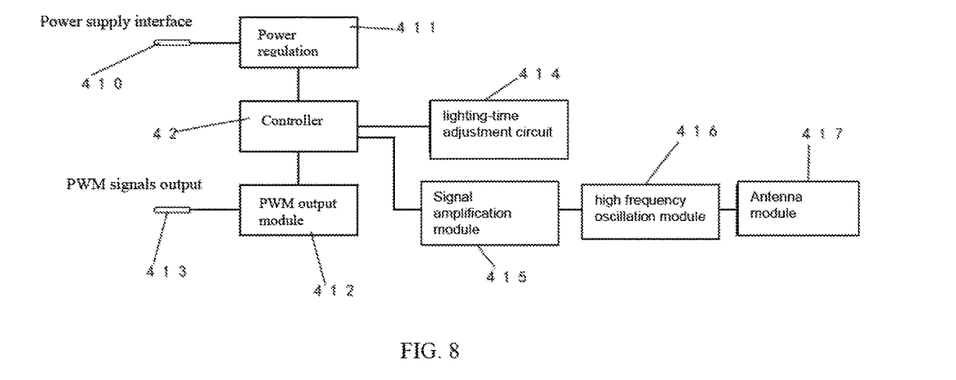
FIG. 8 is a block diagram of a first circuit board in accordance with one embodiment of the present disclosure.

Referring to FIG. 8, the microwave sensing controlling method will be described hereinafter.

The first circuit board 41 includes a power supply port 410, a power regulation circuit 411, a PWM output module 412, a PWM signal output port 413, a lighting-time adjustment circuit 414, and a signal amplification module 415. The controller 42 respectively connects to the power regulation circuit 411, the lighting-time adjustment circuit 414, the PWM output module 412, and the signal amplification module 415. The power supply port 410 connects to the power regulation circuit 411, and the PWM output module 412 connects to the PWM signal output port 413.

Preferably, the first circuit board 41 includes a signal amplification module 415, a high frequency oscillation module 416 and an antenna module 417. The high frequency oscillation module 416 is connected to the signal amplification module 415 to receive the sensing signals.

In the microwave sensing control method, the lamp automatically turns on upon sensing a moving object. The operation modes may include "light-off, full-light, light-off" cycle mode and "slight-light, full-light, slight-light" cycle mode.

In an example, the microwave frequency band may include 2.4 GHz and 5.8 GHz. When the antenna module 417 detects the waveform feedback from the moving object, the high frequency oscillation module 416 converts the waveform into electrical signals. Afterward, the electrical signal is amplified, and is processed by the central processor so as to be converted to PWM signals. The lighting-time adjustment circuit 414 controls a duration of the PWM signals, that is, the lighting time.

Figure 9:
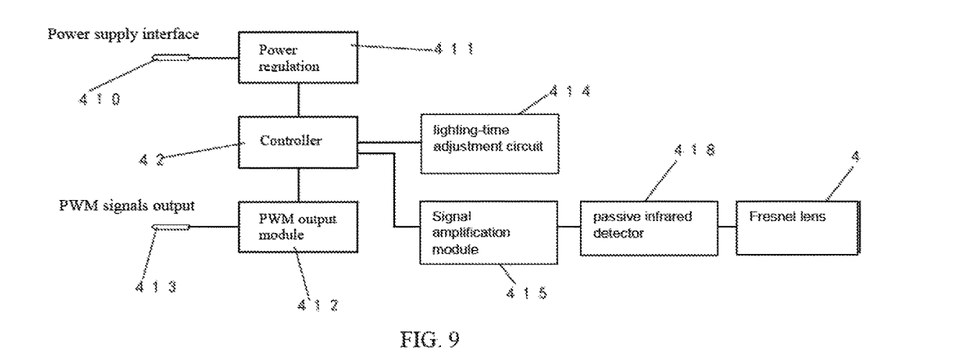
FIG. 9 is a block diagram of a first circuit board in accordance with another embodiment of the present disclosure.

Referring to FIG. 9, the infrared sensing controlling method will be described hereinafter.

The first circuit board 41 includes a power supply port 410, a power regulation circuit 411, a PWM output module 412, a PWM signal output port 413, a lighting-time adjustment circuit 414, and a signal amplification module 415. The controller 42 respectively connects to the power regulation circuit 411, the lighting-time adjustment circuit 414, the PWM output module 412, and the signal amplification module 415. The power supply port 410 connects to the power regulation circuit 411, and the PWM output module 412 connects to the PWM signal output port 413. The power regulation circuit 411 is configured for supply a constant voltage to the controller 42.

In an example, the first circuit board 41 includes signal amplification module 415, a passive infrared detector 418 and a Fresnel lens 419. The passive infrared detector 418 is connected to the signal amplification module 415, and the Fresnel lens 419 and the passive infrared detectors 418 are connected.

In the infrared sensing control method, the lamp automatically turns on upon sensing a moving object. The operation modes may include "light-off, full-light, light-off" cycle mode and "slight-light, full-light, slight-light" cycle mode.

Figure 10:
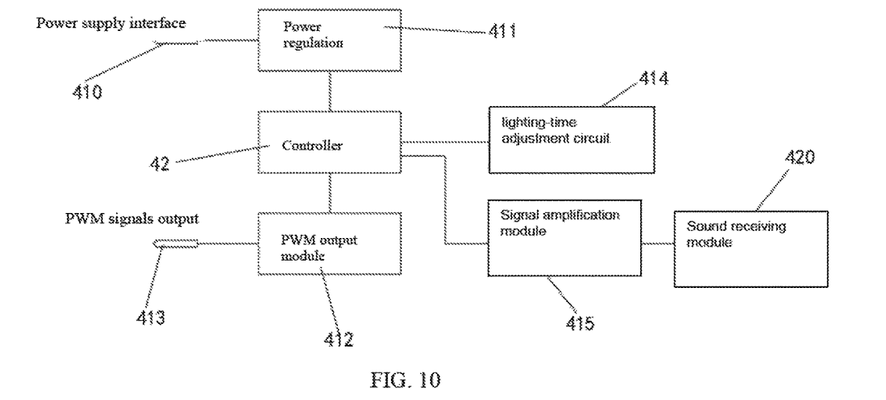
FIG. 10 is a block diagram of a first circuit board in accordance with another embodiment of the present disclosure.

Referring to FIG. 10, the microwave sensing controlling method will be described hereinafter.

The first circuit board 41 includes a power supply port 410, a power regulation circuit 411, a PWM output module 412, a PWM signal output port 413, a lighting-time adjustment circuit 414, and a signal amplification module 415. The controller 42 respectively connects to the power regulation circuit 411, the lighting-time adjustment circuit 414, the PWM output module 412, and the signal amplification module 415. The power supply port 410 connects to the power regulation circuit 411, and the PWM output module 412 connects to the PWM signal output port 413.

In an example, the first circuit board 41 includes a sound receiving module 420 connected to the signal amplification module 415, and the sound receiving module 420 receives sound signals.

In the microwave sensing control method, the lamp automatically turns on upon sensing a moving object. The operation modes may include "light-off, full-light, light-off" cycle mode and "slight-light, full-light, slight-light" cycle mode.

Figure 16:
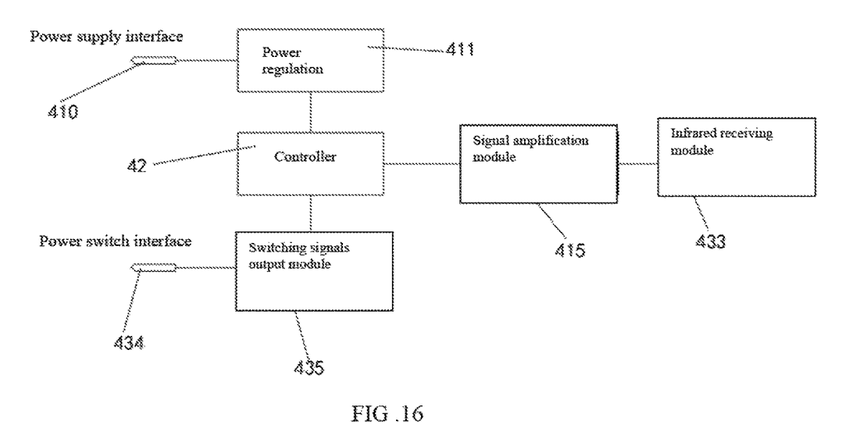
FIG. 16 is a block diagram of a first circuit board in accordance with another embodiment of the present disclosure.
Figure 17:
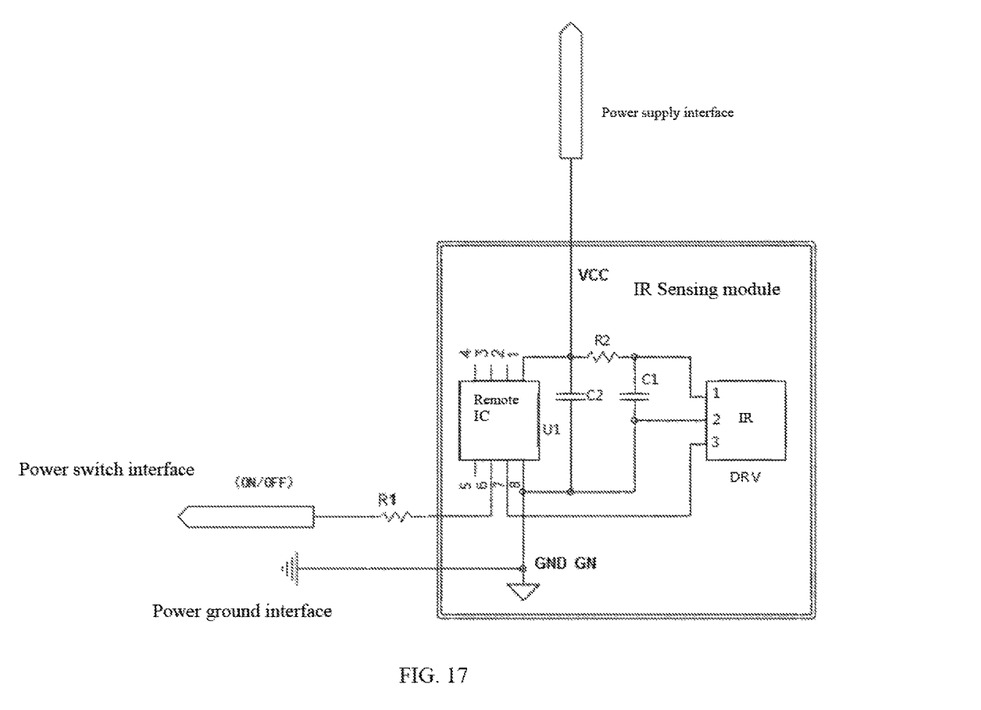
FIGS. 17-18 shows the circuit control principles of the circuit in FIG. 16.
Figure 18:
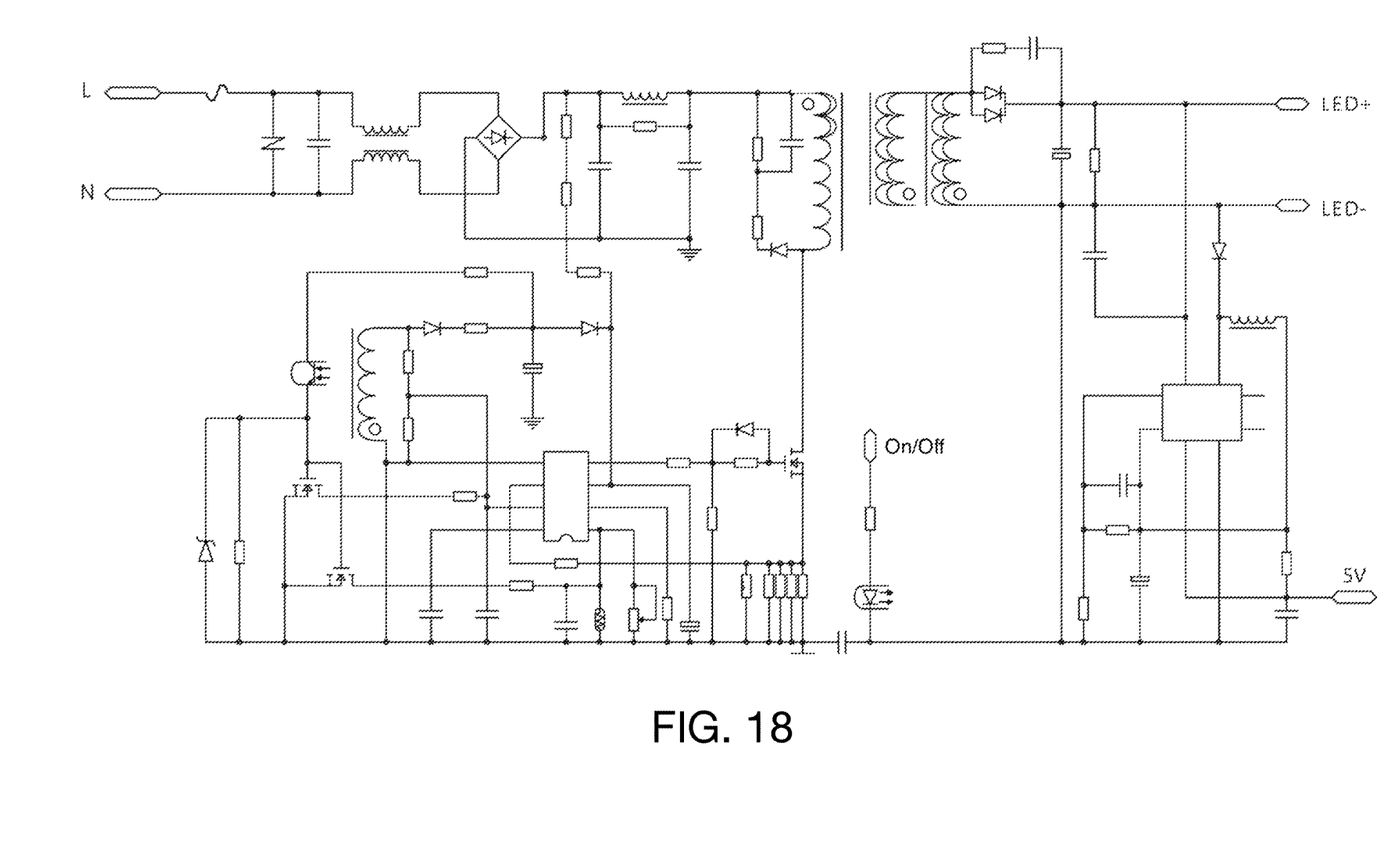

Referring to FIGS. 16-18, the infrared sensing method will be described hereinafter The first circuit board 41 includes a power supply port 410, a power regulation circuit 411, a switching signals output module 435, a power switch interface 434, a controller 42, a signal amplification module 415, and an infrared receiving module 433. In this embodiment, the PWM signal output port 413 is replaced by the power switch interface 434, and the PWM output module 412 is replaced by the switching signals output module 435.

In this embodiment, the infrared receiving module 433 receives the control signals from a remote control. The lamp is turned on or off in accordance with the control signals. In addition to the infrared signals, the remote control may be controlled by radio frequency signals or band signals of other frequencies.

In an example, the controller 42 is controlled by an external device or an external environment, and the controlled modes may include microwave sensing, infrared sensing, sound sensing, light brightness control, Bluetooth control, WiFi control, ZigBee control, 5G4G network control, and radio frequency signals modes.

Figure 11:
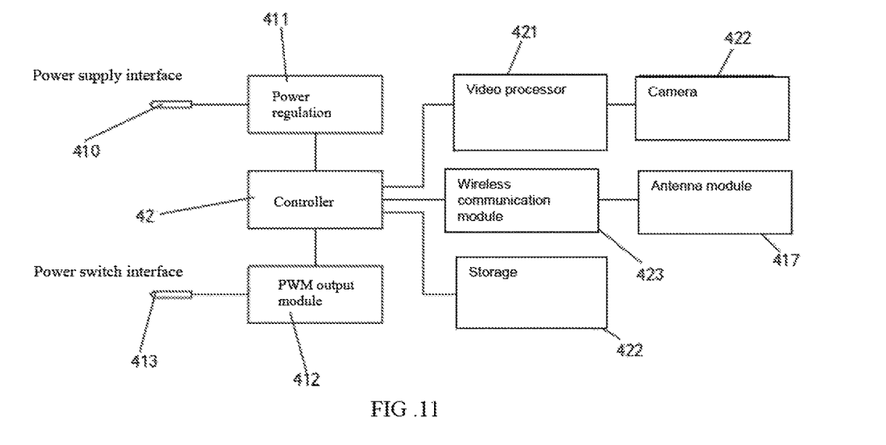
FIG. 11 is a block diagram of a first circuit board in accordance with another embodiment of the present disclosure.

In another embodiment, referring to FIG. 11, the first circuit board 41 includes a video processor 421, a wireless communication module 423, and a storage 422. The video processor 421 connects to a camera 422, and the wireless communication module 423 connects to an antenna module 417. The camera is supplied with the power via the plug 310. The camera 422 is configured to monitor the environment, such that the luminaire of the lamp may be controlled via the connections with external wireless devices.

Figure 12:
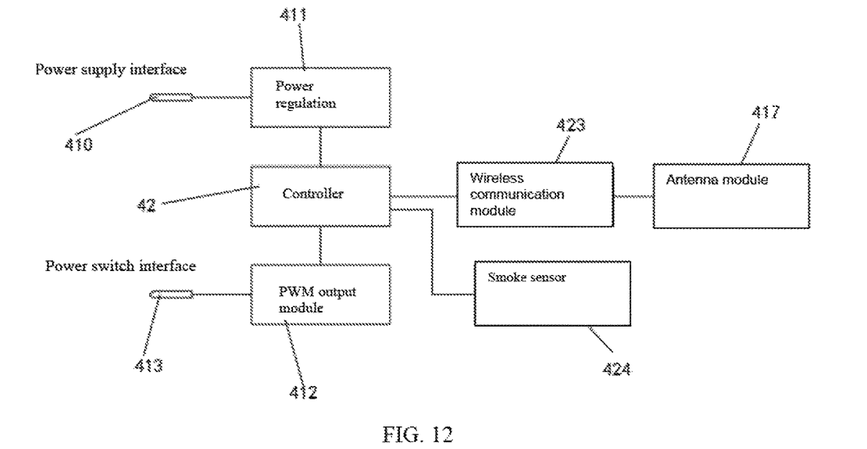
FIG. 12 is a block diagram of a first circuit board in accordance with another embodiment of the present disclosure.

In another embodiment, referring to FIG. 12, the first circuit board 41 further includes a wireless communication module 423 and a smoke sensor 424 connected to the controller 42, and the wireless communication module 423 is connected to the antenna module 417. When the smoke sensor 424 detects the ambient smoke, in addition to the alarm sound, the alarm signals are transmitted to the external alarm receiving platform through the wireless communication module 423 and the antenna module 417, the controller 42 can also control the flashing of the body 3 to be alerted. After the smoke signal is released, the body 3 returns to the normal working state.

Figure 13:
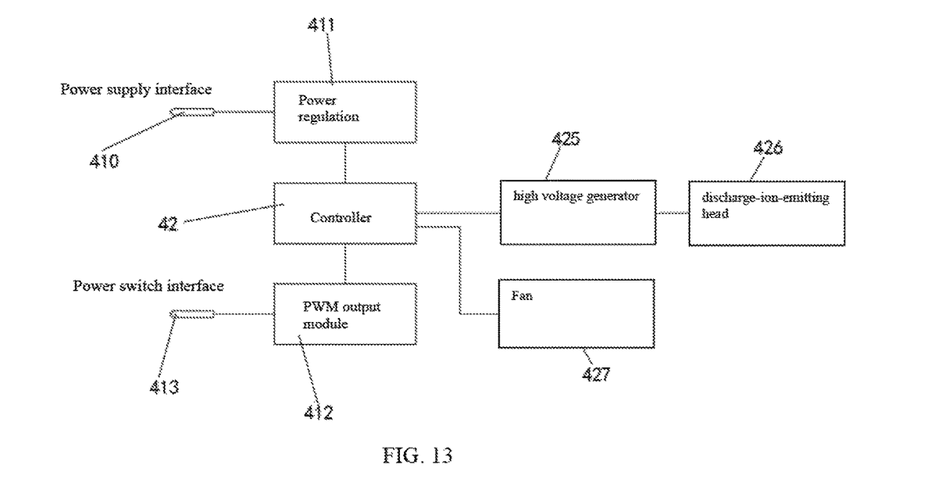
FIG. 13 is a block diagram of a first circuit board in accordance with another embodiment of the present disclosure.

In another embodiment, referring to FIG. 13, the first circuit board 41 further includes a high voltage generator 425 and a fan 427 connected to the controller 42, and the high voltage generator 425 and the discharge-ion-emitting head 426 are connected. The discharge-ion-emitting head 426 and the high voltage generator 425 form a negative-ion-generator module, which can generate negative ions, and the fan 427 accelerates the diffusion of negative ions to the air around the lamp to purify the air.

Figure 14:
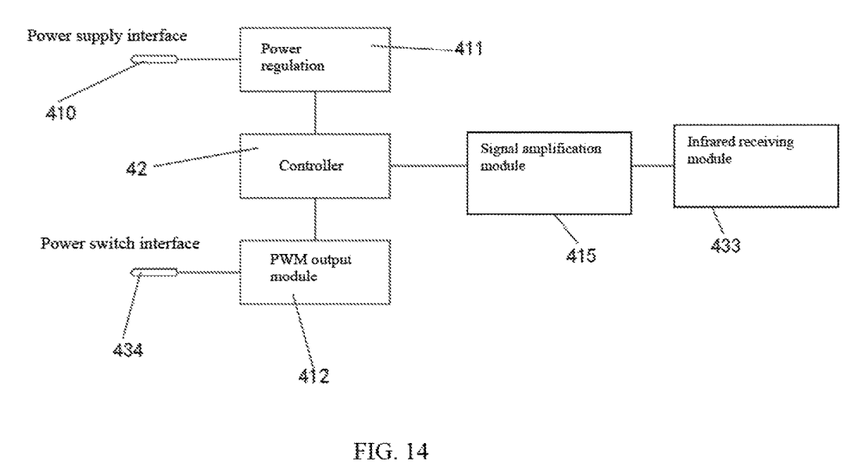
FIG. 14 is a block diagram of a first circuit board in accordance with another embodiment of the present disclosure.

In this embodiment, referring to FIG. 14, the first circuit board 41 further includes an audio amplifier 428, a wireless communication module 423, and a storage 422 connected to the controller 42, and the audio amplifier 428 is connected to the speaker 429, and the wireless communication module 423 is connected to the antenna module 417. The audio file can be stored in the storage 422. The audio amplifier 428 and the speaker 429 can play the audio file of the storage 422 to achieve an acoustic effect. The wireless communication module 423 and the antenna module 417 can control the sound, and also the brightness and switch of the luminaire.

Figure 15:
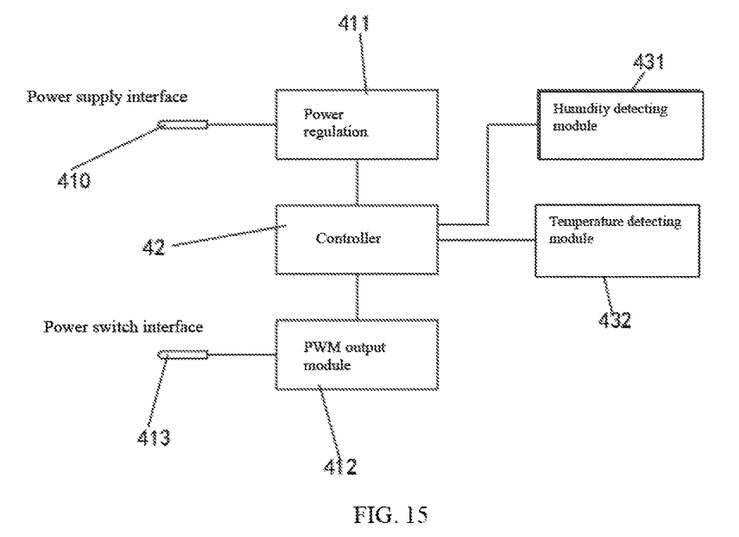
FIG. 15 is a block diagram of a first circuit board in accordance with another embodiment of the present disclosure.

In this embodiment, referring to FIG. 15, the first circuit board 41 further includes a humidity detecting module 431 and a temperature detecting module 432 connected to the controller 42. The humidity detecting module 431 and the temperature detecting module 432 can detect the temperature and humidity of the surrounding environment. Once the temperature and humidity exceed the setting range, the body 3 flashes. When the temperature and humidity do not exceed the setting range, the body 3 functions normally.

In the present invention, the plug interface 310 is not limited to the above functions of the camera, the fire alarm, the sound, etc., and the expansion function based on the plug interface 310 is within the protection scope of the present invention.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A lamp with pluggable control interface, comprising:
a head, a power device electrically connecting to the head, a body, and a control interface device;
wherein the body comprises a receiving chamber, a heat sink, and a connection portion connecting to the power device;
wherein the control interface device comprises a plug-in end, a first circuit board electrically connecting to the plug-in end, a controller mounted on the first circuit board, the plug-in end engages with the connection portion, and the controller is configured to turn on or off the lamp or to turn on a dimming function.

2. The lamp as claimed in claim 1, wherein the control interface device is detachable; and
the connection portion comprises a plug engaging with the plug-in end of the control interface device, a holding portion, and at least one fixing portion extending along a periphery of the holding portion, and a wiring portion, and the fixing portion is perpendicular to the wiring portion such that the connection portion is stably fixed within the receiving chamber.

3. The lamp as claimed in claim 2, wherein the control interface device comprises an upper case, a lower case, and a receiving portion cooperatively defined by the upper case and the lower case; and
the first circuit board is received within the receiving portion, and a cross section of the receiving portion is circular.

4. The lamp as claimed in claim 3, wherein the upper case comprises a plurality of buckle holes;
the lower case comprises a plurality of first holding walls perpendicular to the first circuit board to fix a location of the first circuit board; and
the lower case comprises a plurality of second holding walls corresponding to the buckles holes of the upper case such that the second holding walls respectively engage with the buckle hole to fix the upper case and the lower case.

5. The lamp as claimed in claim 4, wherein the controller adopts one or a combination of controlling modes, and the controlling modes comprises a voltage-dimming mode, a resistance-dimming mode, and a PWM dimming mode.

6. The lamp as claimed in claim 4, wherein the controller is configured being one of a plurality of controlled modes comprising a microwave sensing mode, an infrared sensing mode, and a sound sensing mode.

7. The lamp as claimed in claim 5, wherein the first circuit board comprises a power supply port, a power regulation circuit, a Pulse width modulation (PWM) output module, a PWM signal output port, and a lighting-time adjustment circuit, and the controller respectively connects to the power regulation circuit, the lighting-time adjustment circuit, and the PWM output module, the power supply port connects to the power regulation circuit, and the PWM output module connects to the PWM signal output port.

8. The lamp as claimed in claim 5, wherein the first circuit board comprises a signal amplification module, a high frequency oscillation module and an antenna module, the controller connects to the signal amplification module, the high frequency oscillation module connects to the signal amplification module, and the antenna module connects to the high frequency oscillation module to receive the sensing signals.

9. The lamp as claimed in claim 5, wherein the first circuit board comprises a signal amplification module, a passive infrared detector and a Fresnel lens, the controller connects to the signal amplification module, the passive infrared detector is connected to the signal amplification module, and the Fresnel lens and the passive infrared detectors are connected.

10. The lamp as claimed in claim 5, wherein the first circuit board comprises a sound receiving module connected to a signal amplification module, the controller connects to the signal amplification module, and the sound receiving module receives sound signals.

11. The lamp as claimed in claim 5, wherein the first circuit board comprises a signal amplification module and an infrared receiving module connecting to the signal amplification module.

12. The lamp as claimed in claim 5, wherein the first circuit board comprises a video processor, a wireless communication module, and a storage, the video processor connects to a camera, and the wireless communication module connects to an antenna module.

13. The lamp as claimed in claim 5, wherein the first circuit board comprises a wireless communication module and a smoke sensor connected to the controller, and the wireless communication module is connected to the antenna module.

14. The lamp as claimed in claim 5, wherein the first circuit board comprises a high voltage generator and a fan connected to the controller, and the high voltage generator and a discharge-ion-emitting head are connected, the discharge-ion-emitting head and the high voltage generator form a negative-ion-generator module for generating negative ions, and the fan is configured to accelerate a diffusion of negative ions to the air around the lamp.

15. The lamp as claimed in claim 5, wherein the first circuit board comprises an audio amplifier, a wireless communication module, and a storage connected to the controller, and the audio amplifier is connected to the speaker, and the wireless communication module is connected to the antenna module, audio files are configured being stored in the storage, and the audio amplifier and the speaker are configured to play the audio files.

16. The lamp as claimed in claim 5, wherein the first circuit board comprises a humidity detecting module and a temperature detecting module connected to the controller, the humidity detecting module and the temperature detecting module are configured to detect a temperature and a humidity of a surrounding environment.

* * * * *